(12) United States Patent
Makadia et al.

(10) Patent No.: US 8,057,835 B2
(45) Date of Patent: Nov. 15, 2011

(54) SEED OIL COMPOSITIONS

(75) Inventors: Vallabh Makadia, St Louis, MO (US); Juan P. Arhancet, Creve Coeur, MO (US); Jerald D. Heise, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 1137 days.

(21) Appl. No.: 11/267,540

(22) Filed: Nov. 4, 2005

(65) Prior Publication Data

US 2006/0111254 A1    May 25, 2006

Related U.S. Application Data

(60) Provisional application No. 60/633,914, filed on Dec. 6, 2004, provisional application No. 60/625,506, filed on Nov. 4, 2004.

(51) Int. Cl.
*A23D 9/00* (2006.01)

(52) U.S. Cl. .......................................... 426/601; 554/1

(58) Field of Classification Search .................... 426/601
See application file for complete search history.

(56) References Cited

U.S. PATENT DOCUMENTS

| | | | |
|---|---|---|---|
| 4,089,880 A | 5/1978 | Sullivan | |
| 4,915,972 A | 4/1990 | Gupta et al. | |
| 4,948,811 A | 8/1990 | Spinner et al. | |
| 5,130,449 A | 7/1992 | Lagarde et al. | |
| 5,208,058 A | 5/1993 | Kotani et al. | |
| 5,260,077 A | 11/1993 | Carrick et al. | |
| 5,278,325 A | 1/1994 | Strop et al. | |
| 5,286,886 A | 2/1994 | Van de Sande et al. | |
| 5,315,020 A | 5/1994 | Cheng et al. | |
| 5,387,758 A | 2/1995 | Wong et al. | |
| 5,401,866 A | 3/1995 | Cheng et al. | |
| 5,434,283 A | 7/1995 | Wong et al. | |
| 5,516,924 A | 5/1996 | Van de Sande et al. | |
| 5,534,425 A | 7/1996 | Fehr et al. | |
| 5,545,821 A | 8/1996 | Wong et al. | |
| 5,625,130 A | 4/1997 | Grant et al. | |
| 5,658,767 A | 8/1997 | Kyle et al. | |
| 5,696,278 A | 12/1997 | Segers | |
| 5,710,369 A | 1/1998 | Fehr et al. | |
| 5,714,668 A | 2/1998 | Fehr et al. | |
| 5,714,670 A | 2/1998 | Fehr et al. | |
| 5,750,844 A | 5/1998 | Fehr et al. | |
| 5,763,745 A | 6/1998 | Fehr et al. | |
| 5,767,338 A | 6/1998 | Fan | |
| 5,795,969 A | 8/1998 | Fehr et al. | |
| 5,840,946 A | 11/1998 | Wong et al. | |
| 5,859,350 A | 1/1999 | DeBonte et al. | |
| 5,863,589 A | 1/1999 | Covington, Jr. et al. | |
| 5,866,762 A | 2/1999 | DeBonte et al. | |
| 5,965,755 A | 10/1999 | Sernyk et al. | |
| 5,969,169 A | 10/1999 | Fan | |
| 5,981,781 A * | 11/1999 | Knowlton | 554/224 |
| 6,022,577 A * | 2/2000 | Chrysam et al. | 426/601 |
| 6,063,424 A | 5/2000 | Wells et al. | |
| 6,133,509 A | 10/2000 | Fehr et al. | |
| 6,147,237 A | 11/2000 | Zwanenburg et al. | |
| 6,169,190 B1 | 1/2001 | Lanuza et al. | |
| 6,172,248 B1 | 1/2001 | Copeland et al. | |
| 6,201,145 B1 | 3/2001 | Fan | |
| 6,229,033 B1 | 5/2001 | Knowlton | |
| 6,303,849 B1 | 10/2001 | Potts et al. | |
| 6,313,328 B1 | 11/2001 | Ulrich et al. | |
| 6,340,485 B1 | 1/2002 | Coupland et al. | |
| 6,380,462 B1 * | 4/2002 | Kridl | 800/281 |
| 6,388,110 B1 | 5/2002 | Ulrich et al. | |
| 6,388,113 B1 | 5/2002 | Martinez Force et al. | |
| 6,559,325 B2 | 5/2003 | Fan | |
| 6,562,397 B2 | 5/2003 | DeBonte et al. | |
| 6,583,303 B1 | 6/2003 | DeBonte et al. | |
| 6,610,867 B2 | 8/2003 | Jakel et al. | |
| 6,667,064 B2 | 12/2003 | Surette | |
| 6,797,172 B2 | 9/2004 | Koseoglu et al. | |
| 6,844,021 B2 | 1/2005 | Koike et al. | |
| 6,906,211 B2 | 6/2005 | Tysinger et al. | |
| 6,924,381 B2 | 8/2005 | Dawson | |
| 2003/0180434 A1 | 9/2003 | Fan | |
| 2004/0047971 A1 | 3/2004 | Alander | |
| 2004/0049813 A1 * | 3/2004 | Russell et al. | 800/312 |

FOREIGN PATENT DOCUMENTS

| | | |
|---|---|---|
| DE | 2922146 A1 | 7/1980 |
| EP | 0 077 528 A | 4/1983 |
| EP | 0 226 245 B1 | 6/1987 |
| EP | 0 323 753 B1 | 7/1989 |
| EP | 0 326 198 A2 | 8/1989 |
| EP | 0 347 056 A | 12/1989 |
| EP | 0 348 004 A2 | 12/1989 |
| EP | 0 476 093 B1 | 3/1992 |
| EP | 0 526 954 B1 | 2/1993 |
| EP | 0 606 359 B1 | 7/1994 |
| EP | 0 639 333 A1 | 2/1995 |

(Continued)

OTHER PUBLICATIONS

List, G. et al. 1996. JAOCS 73(6)729.* List, G. 1974. JAOCS 51(2)17.*
Chu, Y. 1993. JAOCS 70(12)1263.*
Neff, W. et al. 1999. JAOCS 76(7)825.*
Warner et al., Frying Quality and Stability of Low- and Ultra-Low-Linolenic Acid Soybean Oils, JAOCS, 80(3):275-280 (2003).
Asoyia, Innovative Soybean Oil Offers Health, Cooking, and Taste Benefits, News Release, www.asoyia.com Oct. 14, 2004, pp. 1-3.
Health Canada, Novel Food Information, Low Linolenic Soybean (OT96-15) Apr. 2001, pp. 1-3.
Iowa State University, About 1% Linolenic Soybean Oil, product brochure, www.notrans.iastate.edu/about.html.
DOW Agrosciences, Natreon Canola Oil, product brochure, www.dowagro.com/natreon/canola/index.htm.
DOW Agrosciences, Natreon Canola Oil, Natreon History, product brochure, www.dowagro.com/natreon/canola/history.htm.
DOW Agrosciences, Natreon Canola Oil, Natreon vs. Other Oils, product brochure, www.dowagro.com/natreon/canola/oils.htm.
Cargill, Odyssey, 95 High Stability Canola Oil, Zero Trans Fat High Stability Oil., product brochure, www.clearvalleyoils.com.

(Continued)

*Primary Examiner* — Carolyn Paden
(74) *Attorney, Agent, or Firm* — Senniger Powers LLP; Chunping Li

(57) ABSTRACT

The present invention is directed to seed oil compositions that can be used for cooking and frying applications. These oil compositions of the present invention have advantageous stability characteristics. In some embodiments, the oil compositions have a low concentration of α-linolenic acid.

5 Claims, 3 Drawing Sheets

FOREIGN PATENT DOCUMENTS

| | | |
|---|---|---|
| EP | 0 813 357 B1 | 3/1995 |
| EP | 0 672 096 B1 | 9/1995 |
| EP | 0 936 266 A | 8/1999 |
| EP | 0 833 882 B1 | 1/2002 |
| GB | 715352 | 9/1954 |
| GB | 2 241 503 A | 4/1991 |
| GB | 2241503 A | 9/1991 |
| JP | S63-44843 A | 2/1988 |
| WO | WO 93/19626 A | 10/1993 |
| WO | WO 96/36684 A1 | 11/1996 |
| WO | WO 99/64614 A | 12/1999 |
| WO | WO 00/44862 A | 8/2000 |
| WO | WO 02/092073 A1 | 11/2002 |
| WO | WO 03/049832 A1 | 6/2003 |
| WO | WO 2004/009827 A | 1/2004 |
| WO | WO 2004/071467 A2 | 8/2004 |

OTHER PUBLICATIONS

Su et al., Oxidative and Flavor Stabilities of Soybean Oils with Low- and Ultra-Low-Linolenic Acid Composition, JAOCS, 80(2): 171-176 (2003).

Asoyia, Ultra Low Lin Soybean Oil, product brochure, www.asoyia.com (2 pages).

Cargill, Clear Valley, High Oleic Sunflower Oil, Zero Trans Fat Oil. High Oxidative Stability. All Natural, product brochure, www.cldarvalleyoils.com.

Cargill, Clear Valley 75, High Oleic Canola Oil, Zero Trans Fat Oil. High Stability. Fresh Flavor. Long Product Shelf Life. Product brochure, www.clearvalleyoils.com.

Cargill, Clear Valley 65, High Oleic Canola Oil, Zero Trans Fat Oil with Exceptional Stability in High Heat Applications. Product brochure, www.clearvalleyoils.com.

Mickel et al., Effect of inert gases on the autoxidation of cis and trans polyunsaturated fatty acid methyl esters Rivista Italiana Delle Sostanze Grasse, 53:312-314 (1976).

Sayanova et al., Identification of primula fatty acid desaturases with n-3 FEBS Letters, 542:100-104 (2003).

Invitation/Partial Search Report issued in analogous application No. PCT/US2005/039809 dated Apr. 7, 2006.

Invitation/Partial Search Report issued in analogous application No. PCT/US2005/039807 dated Apr. 7, 2006.

Wilson et al., "Effect of Controlled Atmosphere Storage on Aflatoxin Production in High Moisture Peanuts (Groundnuts)" J. Stored Prod. Res., 12: 97-100 (1976).

PCT International Search Report for analogous application No. PCT/US2005/039809 mailed Jun. 13, 2006.

List, G. R., et al., "Potential Margarine Oils from Genetically Modified Soybeans," Journal of the American Oil Chemists' Society, 1996, pp. 729-732, vol. 73, No. 6.

Mounts, T. L., et al., "Performance Evaluation of Hexane-Extracted Oils from Genetically Modified Soybeans," Journal of the American Oil Chemists' Society, Feb. 1994, pp. 157-161, vol. 71, No. 2.

Yan, K.-M., et al., "Extraction and Refining of Black Currant Seed Oil," China Oils and Fats, Feb. 2004, 5 pages, vol. 29, No. 2.

\* cited by examiner

SEED OIL COMPOSITIONS

REFERENCE TO RELATED APPLICATONS

This application claims the benefit under 35 USC 119(e) from U.S. provisional application Ser. No. 60/633,914 filed Dec. 6, 2004, and Ser. No. 60/625,506 filed Nov. 4, 2004.

BACKGROUND

The present invention relates to non-hydrogenated or partially hydrogenated non-animal oils having a low level of trans-fatty acids and improved flavor and performance attributes especially suitable for food applications and processes for the preparation thereof.

As consumers have become more aware of the health impact of lipid nutrition, consumption of oils with high levels of unsaturated and polyunsaturated fats and low levels of trans-fats is desirable.

Many oils are chemically hydrogenated; hydrogenation is used to improve performance attributes such as stability. When an oil is hydrogenated, the number of olefinic unsaturations in the fatty acids is reduced. However, hydrogenation can affect the stereochemistry of double bonds by either moving the double bond to another position in the fatty acid or causing the primarily cis-double bonds to isomerize to trans-double bonds. Isomerization of cis-fatty acids to trans-fatty acids is undesirable due to the negative health issues relating to the consumption of trans-fatty acids.

One application of oils is for use during deep-frying. The temperatures of deep-frying can cause the oil to oxidize and thus, degrade faster than it would at a lower temperature. Thus, many unhydrogenated oils with high levels of unsaturated or polyunsaturated fats have limited use in deep-frying operations due to their instability; deep-frying is an important segment of the food processing industry. Many non-hydrogenated soybean oils are unstable and easily oxidized during cooking, which in turn creates off-flavors of the oil and compromises the sensory characteristics of foods cooked in such oils.

Generally, oils extracted from soybeans have an α-linolenic acid (ALA) content of 5%-10%. There are several factors that affect oxidative stability and flavor stability. The amount of ALA in the oil is one of these factors because it is known to oxidize faster than other fatty acids with fewer double bonds. In addition, ALA has been suggested as a precursor to undesirable odor and flavor development in foods. Thus, an oil having a low ALA content and an improved stability in its flavor and performance attributes for use in food operations is needed. Oils of the present invention meet these needs.

SUMMARY OF THE INVENTION

One embodiment of the invention is directed to an unhydrogenated plant oil composition comprising linoleic acid or a derivative thereof, and less than about 3 wt. % α-linolenic acid or a derivative thereof, based upon the total weight of fatty acids or derivatives thereof in the composition, the composition having an anisidine value of less than 2.0, and being derived from a non-algal oil.

Additional embodiments of the invention are directed to a soy oil composition comprising linoleic acid or a derivative thereof, and less than about 3 wt. % α-linolenic acid or a derivative thereof, based upon the total weight of fatty acids or derivatives thereof in the composition, the composition having either: an anisidine value of less than 2.0; a peroxide value of less than 0.3 meq/kg when the composition is free of added stabilizers; less than 1 wt. % trans-fatty acid; or not more than about 80 wt. % oleic acid or a derivative thereof, and at least 800 ppm tocopherols.

Another embodiment of the invention is directed to a crude soy oil composition comprising linoleic acid or a derivative thereof and less than about 3 wt. % α-linolenic acid or a derivative thereof, based upon the total weight of fatty acids or derivatives thereof in the composition, the composition having a peroxide value of 0 meq/kg.

Yet another embodiment of the invention is directed to a soy oil composition comprising less than 56.0 wt. % linoleic acid or a derivative thereof and less than about 3 wt. % α-linolenic acid or a derivative thereof, based upon the total weight of fatty acids or derivatives thereof in the composition.

Another embodiment of the invention is directed to a soy oil composition comprising from about 55 to about 85 wt. % oleic acid or a derivative thereof, from about 2 to about 35 wt. % linoleic acid or a derivative thereof, and not more than about 8 wt. % α-linolenic acid or a derivative, based upon the total weight of fatty acids or derivatives thereof in the composition.

Yet another embodiment of the invention is directed to a soy oil composition comprising from about 25 to about 85 wt. % oleic acid or a derivative thereof, from about 2 to about 65 wt. % linoleic acid or a derivative thereof, not more than about 8 wt. % α-linolenic acid or a derivative thereof, and not more than about 10 wt. % saturated fatty acid or a derivative thereof, based upon the total weight of fatty acids or derivatives thereof in the composition.

Yet another embodiment of the invention is directed to a soy oil composition comprising from about 20 to about 30 wt. % stearic acid or a derivative thereof, not more than about 40 wt. % linoleic acid or a derivative thereof, not more than about 30 wt. % oleic acid or a derivative thereof, not more than about 8 wt. % α-linolenic acid or a derivative thereof, and not more than about 10 wt. % palmitic acid or a derivative thereof, based upon the total weight of fatty acids or derivatives thereof in the composition.

Yet another aspect of the invention is directed to a process for maintaining the storage stability of an oil during shipment or storage, the process comprising storing an oil of the invention in a container at a temperature ranging from about 4 to about 45° C. for at least one month, wherein the oil has an anisidine value of less than 3 after storage.

Yet another aspect of the invention is directed to a process for maintaining the storage stability of an oil during shipment or storage, the process comprising storing an oil of the invention in a container at a temperature ranging from about 4 to about 45° C. for at least one month, wherein the absolute change in the anisidine value of the oil during storage is no more than about 20.

Yet another aspect of the invention is directed to a process for maintaining the storage stability of an oil during shipment or storage, the process comprising storing an oil of the invention in a container; and freezing the container.

Yet another aspect of the invention is directed to a process for maintaining the storage stability of an oil during shipment or storage, the process comprising encapsulating the oil of the invention in an encapsulation material.

Yet another aspect of the invention is directed to a food composition, beverage, nutritional supplement, or cooking oil comprising an oil of the invention.

Yet another aspect of the invention is directed to a method of making a food composition by frying a food product or food analog in an oil of the invention.

DETAILED DESCRIPTION

Figure 1:
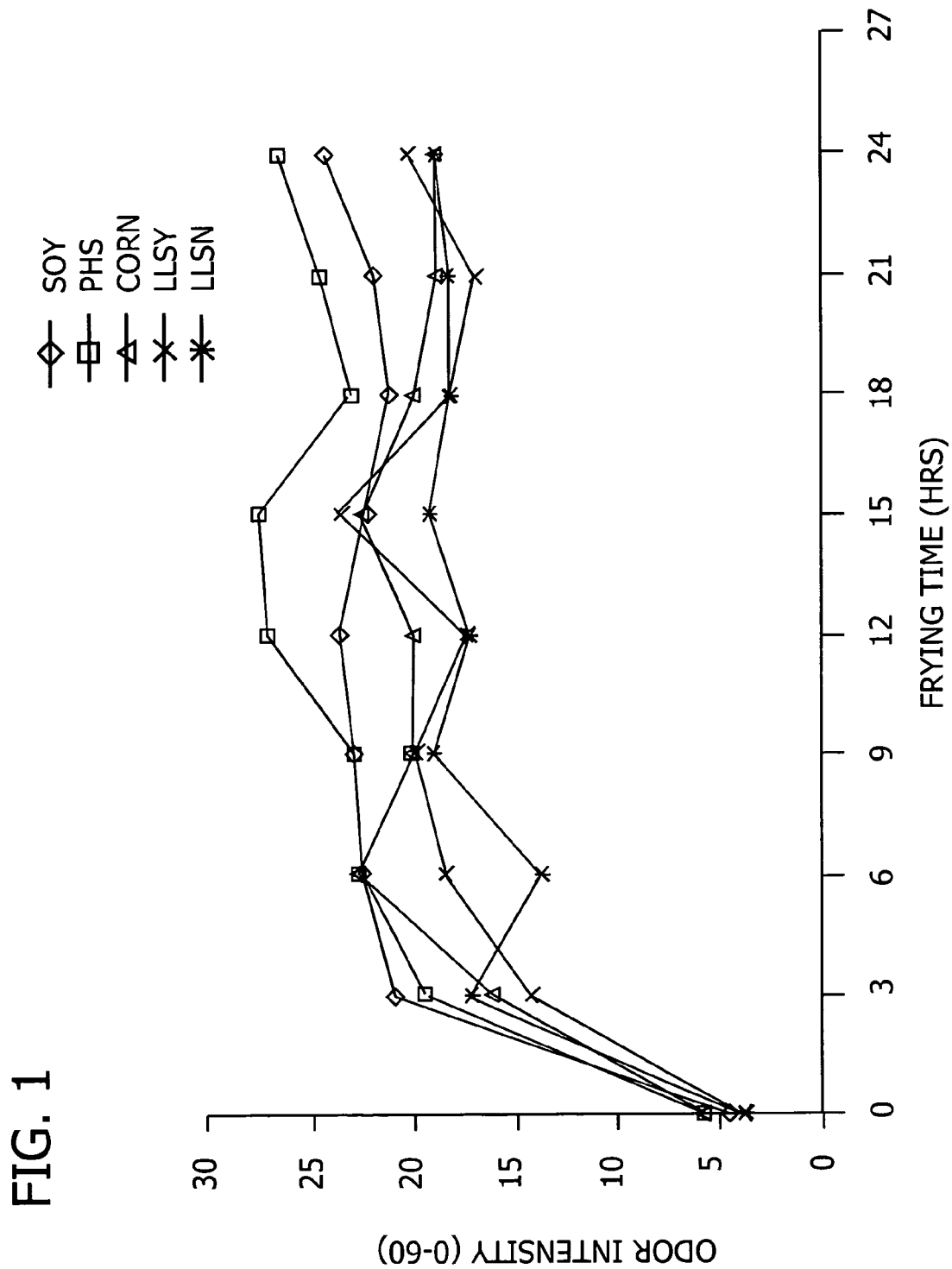
FIG. 1 is a graph of the oil odor intensity versus the amount of time the oil had been used for frying; the method is described in Example 1.

The oils of the present invention have improved stability in terms of taste and smell and low levels of trans-fatty acids. In one embodiment, oils of the present invention can be used for deep-frying of foods. Deep-frying requires high temperatures that increase the oxidative stress of an oil. Typically, oils used for deep-frying applications are hydrogenated to decrease the number of double bonds in the oil's fatty acids, which increases the stability of the oil. However, hydrogenation of oils increases the concentration of undesirable trans-fatty acids. Therefore, certain oil compositions of the present invention having a trans-fatty acid concentration less than about 1 wt. % based on the total weight of fatty acids in the composition and improved stability are advantageous.

Among the various aspects of the present invention is an unhydrogenated plant oil composition comprising linoleic acid or a derivative thereof, and less than about 3 wt. % α-linolenic acid or a derivative thereof, based upon the total weight of fatty acids or derivatives thereof in the composition, the composition having an anisidine value of less than about 2.0, and being derived from a non-algal oil.

In another embodiment, a soy oil composition comprising linoleic acid or a derivative thereof, and less than about 3 wt. % α-linolenic acid or a derivative thereof based on the total weight of fatty acids or derivatives thereof in the composition, the composition having a peroxide value less than about 0.3 meq/kg when the composition is without added stabilizers. In another embodiment, a soy oil composition comprising linoleic acid or a derivative thereof, and less than about 3 wt. % α-linolenic acid or a derivative thereof based on the total weight of fatty acids or derivatives thereof in the composition, the composition having an anisidine value less than about 2.0.

The process for preparing the oils of the present invention has been developed by optimizing the many factors that affect the rate of the oxidation processes including seed storage and treatment, the concentrations of pro-oxidants (e.g., oxygen, chlorophyll and metals), the temperature of the system, the exposure of the seed meats or oil to light and the concentration of stabilizers or antioxidants present naturally or otherwise. The relationships between these factors are complex. The process improvements of the present invention provide oil compositions with improved seed oil stability as characterized by sensory and flavor data when compared to seed oils prepared by conventional methods.

I. Oil Compositions

This section describes the oil compositions in terms of the oxidative stability and the fatty acid content of each composition.

A. Oxidative Stability of Oil Compositions

The various oil compositions of the invention are oils extracted from various non-animal sources. Advantageously, the compositions of the invention possess greater stability than known oil compositions.

Generally, the stability of oils is important for determining their use. For example, oils with low concentrations of unsaturated fatty acids usually resulting from partial hydrogenation are used for deep-frying applications. Typically, these oils are partially hydrogenated due to the lower stability of unsaturated fats to oxidative instability, which can result from high deep-frying temperatures. However, hydrogenation of oils results in the formation of trans-fatty acids, which are known to negatively impact cardiovascular health. Thus, there is interest in preparing stable oils wherein the trans-fatty acid content is low for use in deep-frying applications, and several of the oil compositions of the invention are suitable for such use.

Generally, oils having a greater number of olefinic functionalities have higher oxidation rates than oils having a lower number of olefinic functionalities. The reaction schemes describing the oxidation of unsaturated fatty acids (UFAs) include radical chain reactions characterized as initiation, propagation and termination reactions. An example of an initiation reaction involves abstracting a hydrogen atom from a fatty acid to produce a fatty acid with a free radical. UFAs having more than one double bond and having an allylic carbon are more reactive than polyunsaturated fatty acids having other configurations because the allylic hydrogen is more easily abstracted and the allylic radical is more stable than other radicals. During propagation, the UFA with an allylic radical can react with molecular oxygen to produce a peroxide compound. The peroxide compound can react with another UFA to abstract a hydrogen atom and produce another fatty acid radical in a propagation step. Alternately, an allylic radical can react with another radical to produce an inactive product in a termination step.

Factors affecting the oxidation of oils with one or more unsaturated fatty acids are a function of the concentration of agents which initiate the abstraction of a hydrogen atom from a UFA, the concentration of molecular oxygen, the concentration of compounds which react with the radicals to form stable products (e.g., stabilizers or other radicals that result in termination) and various other reaction conditions that increase or decrease the reaction rates of the oxidation reactions. Molecular oxygen is one of the most important species needed to sustain the production of peroxide compounds from UFAs and the factors discussed herein above have complex relationships.

Generally, the relationship of the concentration of pro-oxidants, which initiate the formation of radical species, to the stability of the highly unsaturated oils depends on the specific pro-oxidant and the initiation reaction that occurs. When molecular oxygen is taken up in a propagation step of the overall oxidation reaction scheme, the relationship between molecular oxygen concentration and the rate of UFA oxidation is approximately linear. However, molecular oxygen can participate in other types of reactions in the overall oxidation reaction scheme. For example, a proposed initiation mechanism is the abstraction of hydrogen from an UFA by trace metal ions. Furthermore, it has been found that UV light and temperature increase the rates of direct attack by oxygen on UFAs. It is also believed that UFAs are oxidized by hydrogen peroxide produced from metal-catalyzed water decomposition or by reaction with trace amounts of singlet oxygen. All of these reactions are plausible and lead to complex relationships between the processing factors, stability, and oil quality discussed herein below.

While the relationship of the concentration of stabilizers to the rate of UFA oxidation depends on the specific stabilizer, this relationship can be complicated by the presence of more than one stabilizer. The addition of multiple stabilizers can act to stabilize each other and when this occurs, a combination of two or more stabilizers can be more effective at terminating free radicals than a single stabilizer.

Despite the complexity of UFA oxidation, the stability of compositions containing UFAs can be determined by measuring certain types of compounds produced by the various oxidation reactions. For example, the peroxide value (PV) is the concentration of peroxide compounds in the oil measured in meq/kg. Peroxide compounds are produced during UFA oxidation, thus, the higher the value of PV, the more UFA oxidation that has occurred. Furthermore, the PV of the oil can be minimized by reducing the formation of peroxides or by removing/decomposing the peroxides or hydroperoxides present in the oil. The PV can be minimized by a variety of techniques, including, but not limited to processing protocols.

Another type of measurement that is utilized to assess the post-oxidative stress that the oil has been exposed to is referred to as the anisidine value (AV) of the oil. The AV indicates the amount of oxidation that the oil has experienced prior to measurement and is a measure of the concentration of the secondary oxidation products. The AV of an oil is a measure of the amount of non-volatile aldehydes and/or ketones in the oil. As the AV of the oil measures the non-volatile aldehyde and/or ketone concentration in the oil (typically, unitless), it is a measure of its oxidative history. Aldehydes and ketones are produced from the decomposition of the peroxide or hydroperoxide species, which are primary oxidation products of the olefinic functionality on a fatty acid. Methods for measuring PV or AV of an oil are well known in the art and include AOCS Cd 8-53 and AOCS Cd 18-90, respectively.

Minimizing the amount of oxidation measured by PV and AV can have significant implications when assessing the oxidative stability of an oil. For example, peroxides and hydroperoxides can readily decompose to form off flavors and aldehydes and ketones, which can act as catalysts for the further oxidative decomposition of the oil.

A method for determining the oxidative stability is the oxidative stability index (OSI); one method for measuring OSI is AOCS Cd 12b-92. The value for the OSI is the time (usually in hours) before the maximum rate change of oxidation (generally referred to as the propagation phase of the oxidation reaction); this time is usually called the induction period. Although there are many factors that affect an oil's OSI value, the value is useful along with the other measures for making semi-quantitative predictions about oil stability.

Another method for determining the oxidative stability of an oil, is to utilize a standardized sensory evaluation. Generally, the standardized sensory evaluation assesses the smell, taste, tactile attributes and flavor of the oil and also, the characteristics of a food product containing the oil by deep-frying the food in the oil or otherwise incorporating the oil in the food. For example, many characteristics of the oil and foods prepared using the oils or having the oil as an ingredient can be evaluated. In addition, the trained panelists can select from a variety of numeric scales to rate the acceptability of the oils tested in the sensory evaluation. A person skilled in the art would be able to design an appropriate sensory evaluation. The sensory evaluation results determine the acceptability of the oil for the specific use and as such, are an important measure of oil stability.

Specific odor and taste indicators associated with oils include bacony, beany, bitter, bland, burnt, buttery, cardboardy, corny, deep fried, fishy, fruity, grassy, green, hay, heated oil, hully, hydrogenated oil, lard, light struck oil, melon, metallic, musty, nutty, overheated oil, oxidized, pointy, paraffin oil, peanut oil, pecan oil, petroleum, phenolic, pine oil, petroleum, phenolic, pine oil, plastic, pondy, pumpkin, rancid, raw, reverted oil, rubbery, soapy, sour, sulfur, sunflower seed shell, watermelon, waxy, weedy and woody. Typically, oils containing more than four double bonds are characterized by a fishy or pondy odor. One embodiment of the present invention is to produce oils containing more than four double bonds, which are bland or buttery in taste and odor at the time of manufacture. Another embodiment of the invention is to have these oils retain their bland or buttery sensory properties when stored for several months.

B. Low α-Linolenic Acid (ALA) Plant Oil Compositions

As discussed herein above, oils having a low content of saturated fatty acids and a high stability are useful for deep-frying or other high temperature applications. The process of the present invention can be used to prepare an unhydrogenated plant oil composition comprising linoleic acid or a derivative thereof, less than about 3 wt. % α-linolenic acid or a derivative thereof, based upon the total weight of fatty acids or derivatives thereof in the composition, the composition has an anisidine value of less than about 2.0, wherein the composition is derived from a non-algal oil. In another embodiment, the oil composition is derived from almond, avocado, babassu, borage, blackcurrant seed, canola, castor bean, coconut, corn, cottonseed, Echium, evening primrose, flax seed, gooseberry, grapeseed, groundnut, hazelnut, linseed, mustard, olive, palm, palm kernel, peanut, perilla, pine seed, poppy seed, pumpkin seed, rapeseed, redcurrant, rice bran, safflower, sesame seed, soybean, sunflower, tea, walnut, or wheat germ oil. In a further embodiment, the oil composition is derived from an oil other than a marine oil.

In a further embodiment, a soy oil composition comprises less than 5, 10, 15, 20, 25, 30, 35, 40, 45, 50, 51, 52, 53, 54, 55 or 56 wt. % linoleic acid or a derivative thereof, based on the total weight of fatty acids or derivatives thereof in the composition.

In another embodiment, a soy oil composition comprises linoleic acid or a derivative thereof, and less than about 3 wt. % α-linolenic acid or a derivative thereof, based upon the total weight of fatty acids or derivatives thereof in the composition, the composition having an anisidine value of less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0.

In another embodiment, a soy oil composition comprises linoleic acid or a derivative thereof and less than about 3 wt. % α-linolenic acid or a derivative thereof, based upon the total weight of fatty acids or derivatives thereof in the composition, the composition having a peroxide value of less than 0.1, 0.2, or 0.3 meq/kg when the composition is free of added stabilizers.

In yet another embodiment, a soy oil composition comprises linoleic acid or a derivative thereof, less than 1 wt. % trans-fatty acid, and less than about 3 wt. % α-linolenic acid or a derivative thereof, based upon the total weight of fatty acids or derivatives thereof in the composition.

In one embodiment, a crude soy oil composition comprises linoleic acid or a derivative thereof and less than about 3 wt. % α-linolenic acid or a derivative thereof, based upon the total weight of fatty acids or derivatives thereof in the composition, the composition having a peroxide value of 0 meq/kg.

In another embodiment, a soy oil composition comprises linoleic acid or a derivative thereof, not more than about 80 wt. % oleic acid or a derivative thereof, and less than about 3 wt. % α-linolenic acid or a derivative thereof, based upon the total weight of fatty acids or derivatives thereof in the composition, and at least 800 ppm tocopherols.

In another embodiment, the unhydrogenated plant oil composition comprises less than about 5, 10, 15, 20, 25, 30, 35, 40, 45, 50, 55, 60, 65, 70, 75 or 80 wt. % oleic acid or a derivative thereof, based on the total weight of fatty acids or derivatives thereof in the composition. In another embodiment, the unhydrogenated plant oil comprises at least 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 ppm tocopherols or more. In another embodiment, the unhydrogenated plant oil comprises less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3 wt. % α-linolenic acid or a derivative thereof, based upon the total weight of fatty acids or derivatives thereof in the composition. In another embodiment, the composition has an anisidine value of less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0.

In one embodiment, the soy oil compositions have an ALA (C18:3n3) content of up to about 3 wt. % based on the total weight of fatty acids in the composition. Preferably, the seeds extracted contain a similar proportion of ALA to total fatty acid content as the oil composition. Therefore, the ALA content in the whole seed is up to about 3.4 wt. % based on the total weight of fatty acids in the composition. Furthermore, the ALA content in the oil throughout process is less than about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 wt. % based on the total weight of fatty acids in the composition. In a particular embodiment, the ALA content in the oil is up to about 1.5, 1.6, 1.8, 2, 2.1, 2.2, 2.3, 2.4, 2.5, 2.6, 2.7 or 2.8 wt. % based on the total weight of fatty acids in the composition; or up to about 1.5, 1.6, 1.7, 1.8, 1.9, 2, 2.1, 2.2, 2.3, 2.4 or 2.5 wt. % based on the total weight of fatty acids in the composition. Preferably, the ALA content of the oil composition is from about 2.0 wt. % to about 3.0 wt. % based on the total weight of fatty acids in the composition; from about 2.2 wt. % to about 3.0 wt. % based on the total weight of fatty acids in the composition; from about 2.2 wt. % to about 2.8 wt. % based on the total weight of fatty acids in the composition; or from about 2.6 wt. % to about 2.8 wt. % based on the total weight of fatty acids in the composition.

In another embodiment, the whole soybean or soy oil has a linoleic acid (LA, C18:2n6) content of at least about 5, 10, 15, 20, 25, 30, 35, 40, 45, 50, or 55 wt. % based on the total weight of fatty acids in the composition. Furthermore, the whole soybean or soy oil has an ALA content of up to about 1.5 wt. % and a LA content of at least about 35, 40, 45, 50, 51, 52, 53, 54, or 55 wt. % based on the total weight of fatty acids in the composition; an ALA content of up to about 1.8 wt. % and a LA content of at least about 35, 40, 45, 50, 51, 52, 53, 54, or 55 wt. % based on the total weight of fatty acids in the composition; an ALA content of up to about 2 wt. % and a LA content of at least about 35, 40, 45, 50, 51, 52, 53, 54, or 55 wt. % based on the total weight of fatty acids in the composition; an ALA content of up to about 2.2 wt. % and a LA content of at least about 35, 40, 45, 50, 51, 52, 53, 54, or 55 wt. % based on the total weight of fatty acids in the composition; or an ALA content of up to about 2.5 wt. % and a LA content of at least about 35, 40, 45, 50, 51, 52, 53, 54, or 55 wt. % based on the total weight of fatty acids in the composition.

In yet another embodiment, the whole soybean or soy oil composition during or after processing has an ALA content of up to about 2.5 wt. % based on the total weight of fatty acids in the composition and a tocopherol (e.g., α-tocopherol, β-tocopherol, γ-tocopherol) content of at least about 400, 450, 500, 600, 700, 800, 805, 810, 820, 830, 840, 850, 860, 870, 880, 890, 900, 1000, 1100, 1200, 1300, 1400, 1500, or 1600 ppm or more.

In a further embodiment, the whole soybean or soy oil composition during or after processing has an ALA content of up to about 2.5 wt. % based on the total weight of fatty acids in the composition and a PV during or after processing of up to about 0.1, 0.2, 0.3, 0.4, 0.5, 0.6, 0.7, 0.9 or 1. In a particular embodiment, the crude oil has an ALA content of up to about 2.5 wt. % based on the total weight of fatty acids in the composition and a PV during or after processing of up to about 0.1, 0.2, 0.3, 0.4 or 0.5.

Alternately, the whole soybean or soy oil composition during or after processing has an ALA content of up to about 2.5 wt. % based on the total weight of fatty acids in the composition and an AV during or after processing of up to about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2. In a particular embodiment, the refined, bleached and deodorized (RBD) oil composition has an ALA content of up to about 2.5 wt. % based on the total weight of fatty acids in the composition and an AV of up to about 0.1, 0.2, 0.3, 0.4 or 0.5.

In yet a further embodiment, the soy RBD oil has an ALA content of up to about 2.5 wt. % based on the total weight of fatty acids in the composition and an OSI of at least about 5, 5.5, 6, 6.5, 7, 7.5, 8, 8.5, 9, 9.5 or 10 wherein the oil is not hydrogenated and does not have added stabilizers.

Any of the oil compositions of section 1.C. has a frying life at least 25% longer as compared to that of an oil composition comprising about 8-10 wt. % α-linolenic acid or a derivative thereof and otherwise having the same composition except that linoleic acid content is decreased by the same amount as α-linolenic acid content is increased.

In one embodiment, an oil composition having an ALA content of less than about 3 wt. % based on a total weight of fatty acids in the composition is used for deep-frying wherein the food which is deep-fried has a significantly better flavor quality relative to that of food fried in an oil composition having an ALA content of about 5 to about 10 wt. % based on a total weight of fatty acids in the composition, wherein the flavor quality is determined by a standardized sensory evaluation. In another embodiment, an oil composition having an ALA content of less than about 3 wt. % based on a total weight of fatty acids in the composition has a significantly reduced overall room-odor intensity relative to the overall room-odor intensity of an oil having an ALA content of about 5 to about 10 wt. % based on a total weight of fatty acids in the composition, wherein the room-odor intensity is determined by a standardized sensory evaluation.

Further, any one of the oil composition embodiments described in section I.C. can be derived from an oil other than a marine oil, such as a fish oil or an algal oil. Further, the composition of the oils described above can be derived from a plant oil other than blackcurrant oil, borage oil, Echium oil, evening primrose oil, gooseberry oil, hemp oil, or redcurrant oil.

Any one of the oil composition embodiments described in section I.C. can be derived from a genetically-modified seed selected from the group consisting of *Arabidopsis*, canola, carrot, coconut, corn, cotton, flax, linseed, maize, palm kernel, peanut, potato, rapeseed, safflower, soybean, sunflower, tobacco, and mixtures thereof.

The present invention is also useful for extracting and purifying polyunsaturated fatty acids low in alpha-linolenic acid from plant tissue, including plant seed tissue. For example, the methods of the invention are useful for the extraction and/or stabilization of polyunsaturated fatty acids low in alpha-linolenic acid from recombinant plants (such as *Glycine max* (soybean), *Helianthus annuus* (sunflower), *Sinapis alba, Brassica* spp. (including *B. napus, B. rapa, B. juncea*)) produced with, for example, the compositions and methods of U.S. Pat. Nos. 6,680,396; 6,583,303; 6,559,325; 6,441,278; 6,407,317; 6,323,392; 6,303,849; 6,270,828; 6,201,145; 6,169,190; 6,133,509; 6,084,157; 6,063,947; 5,969,169; 5,965,755; 5,859,350; 5,850,030; 5,850,026; 5,767,338; 5,763,745; 5,750,827; 5,714,670; 5,714,669; 5,714,668; 5,710,369; 5,710,366; 5,638,637; 5,625,130; 5,557,037; 5,534,425; 5,530,183; 5,387,758; and also U.S. patent application Ser. Nos. 20040098762; 20040049813; 20040010819; 20040006792; 20030172399; 20030163844; 20030159176; 20030154514; 20030079250; 20030066105; 20020129408; 20020092042; and 20020042935 (the prior references are herein incorporated by reference).

Soybean germplasms with a low content of linolenic acid have been developed (See e.g. Takagi et al., Agric. Biol. Chem. (1990) 54, 1735-1738; Fehr et al., Crop Sci. (1992) 32,903-906; Rahman and Takagi, Theor. Appl. Genet. (1997) 94, 299-302; Rahman et al., Crop Sci. (1998) 38, 702-706; Rahman et al., Crop Science (2001) 41, 26-29). Inheritance studies showed that low linolenic acid is controlled by either a single locus or two loci. The single locus fan was found in C1640 (Wilcox and Cavins, Theor. Appl. Genet. (1985) 71, 74-78); PI 361088B (Rennie et al., Crop Sci. (1988) 28, 655-657); PI 123440 (Rennie and Tanner, Soybean Genet. Newsl. (1989) 16, 25-26); A5 (Rennie and Tanner, Crop Sci. (1991) 31, 297-301); and M-5 (Rahman et al., Breed. Sci. (1996) 46, 155-158). Fan2 was found in A23 (Fehr et al., Crop Sci. (1992) 32, 903-906); fanx in KL-8 (Rahman and Takagi, Theor. Appl. Genet. (1997) 94, 299-302); and fanxa in M-24 (Rahman et al., Crop Sci. (1998) 38, 702-706). Evidence of two loci were found in A16 and A17 (fanfan2, Fehr et al., Crop Sci. (1992) 32, 903-906); MOLL (fanfanx, Rahman and Takagi, Theor. Appl. Genet. (1997) 94, 299-302); and LOLL (fanfanxa, Rahman et al., Crop Sci. (1998) 38, 702-706). The germplasms A16, A17, and LOLL are reported to contain 250 to 280 g kg-1 linolenic acid, which is much lower than normally occurs in soybean oil. The methods and compositions of the invention are useful in the extraction and/or stabilization of polyunsaturated fatty acids from soybean produced according to the above listed reports.

Many breeding studies have been conducted to improve the fatty acid profile of *Brassica* varieties. Pleines and Friedt (Fat Sci. Technol. (1988) 90(5), 167-171) describe plant lines with reduced C18:3 levels (2.5-5.8%) combined with high oleic content (73-79%). Rape producing seed oil with 3% linolenic acid and 28% linoleic acid is disclosed in Scarth et al., Can. J. Plant Sci (1988) 68, 509-511. Roy and Tarr (Z. Pflanzenzuchtg, (1985) 95(3), 201-209) teach transfer of genes through an interspecific cross from *Brassica juncea* into *Brassica napus* resulting in a reconstituted lien combining high linoleic with low linolenic acid content. Roy and Tarr (Plant Breeding (1987) 98, 89-96) discuss development of *B. napus* having improved linolenic and linolenic acid content. EPO Application No.323,751, published Jul. 12, 1989, discloses seeds and oils having greater than 79% oleic acid combined with less than 3.5% linolenic acid. The methods and compositions of the invention are useful in the extraction and/or stabilization of polyunsaturated fatty acids from *Brassica* produced according to the above listed reports.

C. Low, Mid and High Oleic Acid Soy Oil Compositions

It is sometimes desirable for a soy oil to include more oleic acid than is present in conventional soy oil to provide an oil that is heat and oxidation stable at deep-frying temperatures without the need for hydrogenation. In one embodiment of the invention, a soy oil composition comprises from about 55 to about 85 wt. % oleic acid or a derivative thereof, from about 2 to about 35 wt. % linoleic acid or a derivative thereof, and not more than about 1, 2, 3, 4, 5, 6, 7 or 8 wt. % α-linolenic acid or a derivative thereof, based upon the total weight of fatty acids or derivatives thereof in the composition. In another embodiment, not more than about 0.1, 0.2, 0.3, 0.4, 0.5, 0.6, 0.7, 0.8, 0.9, 1.0, 2.0, 3.0, 4.0, 5.0, 6.0, 7.0 or 8.0 wt. % α-linolenic acid or a derivative thereof is present in the soy oil composition. In a preferred embodiment, not more than about 4 wt. % α-linolenic acid or a derivative thereof, and less than 1, 2, 3, 4, 5, 6, 7, 8, 9, or 10 wt. % saturated fatty acid or a derivative thereof is present in the soy oil composition.

In another embodiment, a soy oil composition comprises from about 25 to about 85 wt. % oleic acid or a derivative thereof, from about 2 to about 65 wt. % linoleic acid or a derivative thereof, not more than about 1, 2, 3, 4, 5, 6, 7 or 8 wt. % α-linolenic acid or a derivative thereof, and not more than about 1, 2, 3, 4, 5, 6, 7, 8, 9, or 10 wt. % saturated fatty acid or a derivative thereof, based upon the total weight of fatty acids or derivatives thereof in the composition. In a preferred embodiment, not more than about 4 wt. % α-linolenic acid or a derivative thereof is present in the composition.

D. High Stearic Acid Soy Oil Compositions

In some applications, it is desirable for a soy oil to include a relatively high stearic acid (C18:0) content as compared to conventional soy oils, which contain about 5 wt. % stearic acid. In one embodiment of the invention, a soy oil composition comprises from about 20 to about 30 wt. % stearic acid or a derivative thereof, less than about 5, 10, 15, 20, 25, 30, 35 or 40 wt. % linoleic acid or a derivative thereof, less than about 5, 10, 15, 20, 25 or 30 wt. % oleic acid or a derivative thereof, not more than about 8 wt. % α-linolenic acid or a derivative thereof, and less than about 10 wt. % palmitic acid or a derivative thereof, based upon the total weight of fatty acids or derivatives thereof in the composition. In one embodiment, the composition contains about 1, 2, 3, 4, 5, 6, 7, 8, 9 or 10 wt. % palmitic acid or a derivative thereof. In another embodiment, the composition contains about 1, 2, 3, 4, 5, 6, 7 or 8 wt. % α-linolenic acid or a derivative thereof.

For any one of the preceding oil compositions described above except for those that are specifically unhydrogenated, the compositions can be partially hydrogenated or transesterified. Preferably, in another embodiment, the oil composition of section I has been partially hydrogenated and has a content of less than about 0.1, 0.2, 0.3, 0.4, 0.5, 0.6, 0.7, 0.8, 0.9 or 1 wt. % trans-fatty acids based on a total weight of fatty acids or derivatives thereof in the composition.

For any one of the preceding oil compositions described above, the composition can include less than about 0.1, 0.2, 0.3, 0.4, 0.5, 0.6, 0.7, 0.8, 0.9, 1.0, 2.0, 3.0, 4.0, 5.0, 6.0, 7.0, 8.0, 9.0 or 10 wt. % saturated fatty acid or a derivative thereof. Oils low in saturated fat are often preferred by consumers for the health benefits attributed to them as compared to oils that are relatively high in saturated fat content. In one embodiment, such oils are derived from genetically modified plant oils containing decreased levels of saturated fats. Examples include seeds of plants derived from palm, coconut, peanut, cottonseed, corn, maize, flax, canola, rapeseed, linseed, flax, soybean, canola, rapeseed, safflower, sunflower and mixtures thereof. Exemplary saturated fats include myristic acid (C14:0), palmitic acid (C16:0) and stearic acid (C18:0).

For any one of the oil compositions described above and containing less than 8 wt. % α-linolenic acid or a derivative thereof, the composition has a significantly better flavor quality as compared to that of an oil comprising about 8-10 wt. % α-linolenic acid or a derivative thereof and otherwise having the same composition, wherein flavor quality is determined by a standardized sensory evaluation. Further, for any one of the oil compositions described and containing less than 8 wt. % α-linolenic acid or a derivative thereof, the composition has a significantly decreased room-odor intensity as compared to that of an oil comprising about 8-10 wt. % α-linolenic acid or a derivative thereof and otherwise having the same composition, a significant difference in overall room-odor intensity being indicated by a difference of greater than 1.0 obtained in a standardized sensory evaluation.

For any one of the oil compositions described above, the composition of the crude oil is such that it can have a peroxide value of 0 meq/kg.

For any one of the preceding oil compositions described above, the composition is storage stable under refrigeration for at least 1, 2, 3, 4, 5, 6, 7, 8, 9, 10, 11, 12, 13, 14, 15, 16, 17, 18, 19, 20, 21, 22, 23, or 24 months or more.

For any one of the preceding oil compositions described above in section I., the composition is storage stable at about room temperature for at least 1, 2, 3, 4, 5, 6, 7, 8, 9, 10, 11, 12, 13, 14, 15, 16, 17, 18, 19, 20, 21, 22, 23, or 24 months or more.

For any one of the preceding oil compositions described above in section I., the composition is storage stable at a temperature of from 5 to about 45° C. for at least 1, 2, 3, 4, 5, 6, 7, 8, 9, 10, 11, 12, 13, 14, 15, 16, 17, 18, 19, 20, 21, 22, 23, or 24 months or more.

For any one of the preceding oil compositions described above, the anisidine value can be not more than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0.

For any one of the preceding oil compositions described above, the peroxide value can be not more than 0.1, 0.2, 0.3, 0.4, 0.5, 0.6, 0.7, 0.8, 0.9 or 1.0 meq/kg.

For any one of the preceding oil compositions described above, composition can comprise not more than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 wt. % α-linolenic acid or a derivative thereof.

For any one of the preceding oil compositions described above, composition can comprise not more than 5, 10, 15, 20, 25, 30, 35, 40, 45, 50 or 55 wt. % linoleic acid or a derivative thereof.

In a further embodiment, an oil composition described above has a significantly reduced overall room-odor intensity relative to the overall room-odor intensity of an oil having an anisidine value greater than about 2.0, wherein the room-odor intensity is determined by a standardized sensory evaluation as described above.

In another embodiment, any of the preceding oil compositions described above can be blended oil compositions. The oil compositions can result from blending of the whole seeds, blending of the seed meats, flakes, fines, miscella, crude oil, refined oil, refined and bleached oil or refined, bleached and deodorized oil. Blending or interesterification of low ALA oil compositions with high SDA oil compositions, high stearic oil compositions, corn oil compositions, partially hydrogenated oil compositions, wheat germ oil compositions, and canola oil compositions, for example, enhance stability, quality and functionality of the oil compositions, particularly for use in foods or for frying. The oil compositions of the invention can also be a blend of a marine oil made with a process of the invention and a plant oil made with a process of the invention; marine oil made with a process of the invention and a plant oil; an oil containing at least one polyunsaturated fatty acid having four or more carbon-carbon double bonds or a derivative thereof made with a process of the invention and a plant oil made with a process of the invention; an oil containing at least one polyunsaturated fatty acid having four or more carbon-carbon double bonds or a derivative thereof made with a process of the invention and a plant oil; or an oil containing at least one polyunsaturated fatty acid having four or more carbon-carbon double bonds or a derivative thereof and a plant oil made with a process of the invention.

Along with enhancement of the oxidative stability of the oil compositions without added stabilizing compounds, the oil compositions can further include stabilizers. Stabilizers, generally, are added to the oil compositions to lengthen the initiation phase and delay the onset of the propagation phase. Stabilizers can delay the onset of the propagation phase by up to about 15 times or more as compared to the time to the propagation phase in an oil having no added stabilizers. Depending on the identity of the particular stabilizer, these compounds can have different modes of action. Some stabilizers chelate metals or other catalytic species that would otherwise interact with the triglycerides of the oil and increase the rate of oxidation of the oil. Other stabilizers act as antioxidant molecules and react with free radical species which could oxidize the fatty acids of the triglycerides to peroxides, which can in turn oxidize with other fatty acids as described in more detail above in section I.A.

Exemplary stabilizers can include anoxomer, ascorbic acid, ascorbyl palmitate, ascorbyl stearate, butylated hydroxyanisole (BHA), butylated hydroxytoluene (BHT), t-butyl hydroquinone (TBHQ), 3-t-butyl-4-hydroxyanisole, calcium ascorbate, calcium disodium EDTA, catalase, cetyl gallate, citric acid, clove extract, coffee bean extract, 2,6-di-t-butylphenol, dilauryl thiodipropionate, disodium citrate, disodium EDTA, dodecyl gallate, edetic acid, erythorbic acid, 6-ethoxy-1,2-dihydro-2,2,4-trimethylquinoline, ethyl gallate, ethyl maltol, eucalyptus extract, fumaric acid, gentian extract, glucose oxidase, heptyl paraben, hesperetin, 4-hydroxymethyl-2,6-di-t-butylphenol, N-hydroxysuccinic acid, isopropyl citrate, lecithin, lemon juice, lemon juice solids, maltol, methyl gallate, methylparaben, octyl gallate, phosphatidylcholine, phosphoric acid, pimento extract, potassium bisulfite, potassium lactate, potassium metabisulfite, potassium sodium tartrate anhydrous, propyl gallate, rice bran extract, rosemary extract, sage extract, sodium ascorbate, sodium erythorbate, sodium hypophosphate, sodium ascorbate, sodium erythorbate, sodium hypophosphate, sodium metabisulfite, sodium sulfite, sodium thisulfate pentahydrate, soy flour, sucrose, L-tartaric acid, α-terpineol, tocopherol, D-α-tocopherol, DL-α-tocopherol, tocopheryl acetate, D-α-tocopheryl acetate, DL-α-tocopheryl acetate, 2,4,5-trihydroxybutyrophenone, wheat germ oil, and combinations thereof.

II. Process for Preparing Oil Compositions

Generally, the following steps are used to process seed oils: preparation, cracking and dehulling, conditioning, milling, flaking or pressing, extracting, degumming, refining, bleaching and deodorizing. Each of these steps will be discussed in more detail herein below. The discussion details the process for each of the steps used currently in commercial application. A person of ordinary skill would know that the steps could be combined, used in a different order or otherwise modified.

Generally, the preparation step includes the initial cleaning process, which removes stones, dirt, sticks, worms, insects, metal fragments, and other debris collected during the harvest and storage of the seeds. Extraneous matter as described above can affect the quality of the final seed oil by containing compounds that negatively impact its chemical stability. Preferably, ripe, unbroken seeds having reduced levels of chlorophyll and reduced levels of free fatty acids are used.

After the preparation step, the seeds are cracked and dehulled. Cracking and dehulling can be accomplished in a variety of ways, which are well known in the art. For example, the seeds can be cracked and dehulled using a seed cracker, which mechanically breaks the seeds and releases hulls and directly exposes the inner seed meat to air. After cracking, the hulls can be separated from the seed meats by a dehuller. In one aspect, the dehuller can separate the hulls from the seed meats due to the density difference between the hulls and the seeds; the hulls are less dense than the seed meats. For example, aspiration will separate the hulls from the cracked seed meats. Dehulling reduces the crude fiber content, while increasing the protein concentration of the extracted seed meats. Optionally, after dehulling, the hulls can be sieved to recover the fines generated in the cracking of the seeds. After recovery, the fines can be added back to the seed meats prior to conditioning.

Once the seeds are cracked, the oxygen exposure of the seed meats can optionally be minimized, which would reduce oil oxidation and improve oil quality. Furthermore, it will be understood by persons skilled in the art that minimization of oxygen exposure may occur independently at each of the subsequently disclosed oilseed processing steps.

Once the seeds are cracked and dehulled, they are conditioned to make the seed meats pliable prior to further processing. Furthermore, the conditioning ruptures oil bodies. Further processing, in terms of flaking, grinding or other milling technology is made easier by having pliable seed meats at this stage. Generally, the seed meats have moisture removed or added in order to reach a 6-10 wt. % moisture level. If moisture is removed, this process is called toasting and if moisture is added, this process is called cooking. Typically, the seed meats are heated to 40-90° C. with steam which is dry or wet depending on the direction of adjustment of the moisture content of the seed meats. In some instances, the conditioning step occurs under conditions minimizing oxygen exposure or at lower temperatures for seeds having high PUFA levels.

Once the seed meats are conditioned, they can be milled to a desired particle size or flaked to a desired surface area. In certain cases, the flaking or milling occurs under conditions minimizing oxygen exposure. Flaking or milling is done to increase the surface area of the seed meats and also rupture the oil bodies thereby facilitating a more efficient extraction. Many milling technologies are appropriate and are well known in the art. The considerations when choosing a method of milling and a particle size for the ground seed are contingent upon, but not limited to the oil content in the seed and the desired efficiency of the extraction of the seed meats or the seed. When flaking the seed meats, the flakes are typically from about 0.1 to about 0.5 mm thick; from about 0.1 to about 0.35 mm thick; from about 0.3 to about 0.5 mm thick; or from about 0.2 to about 0.4 mm thick.

Optionally, after the seed meats are milled, they can be pressed. Typically, the seed meats are pressed when the oil content of the seed meats is greater than about 30 wt. % of the seeds. However, seeds with higher or lower oil contents can be pressed. The seed meats can be pressed, for example, in a hydraulic press or mechanical screw. Typically, the seed meats are heated to less than about 55° C. upon the input of work. When pressed, the oil in the seed meats is pressed through a screen, collected and filtered. The oil collected is the first press oil. The seed meats from after pressing are called seed cake; the seed cake contains oil and can be subjected to solvent extraction.

After milling, flaking or optional pressing, the oil can be extracted from the seed meats or seed cake by contacting them with a solvent. Preferably, n-hexane or iso-hexane is used as the solvent in the extraction process. Typically, the solvent is degassed prior to contact with the oil. This extraction can be carded out in a variety of ways, which are well known in the art. For example, the extraction can be a batch or continuous process and desirably is a continuous counter-current process. In a continuous counter-current process, the solvent contact with the seed meat leaches the oil into the solvent, providing increasingly more concentrated miscellas (i.e., solvent-oil), while the marc (i.e., solvent-solids) is contacted with miscellas of decreasing concentration. After extraction, the solvent is removed from the miscella in a manner well known in the art. For example, distillation, rotary evaporation or a rising film evaporator and steam stripper can be used for removing the solvent. After solvent removal, if the crude oil still contains residual solvent, it can be heated at about 95° C. and about 60 mmHg.

The above processed crude oil contains hydratable and nonhydratable phosphatides. Accordingly, the crude oil is degummed to remove the hydratable phosphatides by adding water and heating to from about 40 to about 75° C. for approximately 5-60 minutes depending on the phosphatide concentration. Optionally, phosphoric acid and/or citric acid can be added to convert the nonhydratable phosphatides to hydratable phosphatides. Phosphoric acid and citric acid form metal complexes, which decreases the concentration of metal ions bound to phosphatides (metal complexed phosphatides are nonhydratable) and thus, converts nonhydratable phosphatides to hydratable phosphatides. Optionally, after heating with water, the crude oil and water mixture can be centrifuged to separate the oil and water, followed by removal of the water layer containing the hydratable phosphatides. Generally, if phosphoric acid and/or citric acid are added in the degumming step, about 1 wt. % to about 5 wt. %; preferably, about 1 wt. % to about 2 wt. %; more preferably, about 1.5 wt. % to about 2 wt. % are used. This process step is optionally carried out by degassing the water and phosphoric acid before contacting them with the oil.

Furthermore, the crude oil contains free fatty acids (FFAs), which can be removed by a chemical (e.g., caustic) refining step. When FFAs react with basic substances (e.g., caustic) they form soaps that can be extracted into aqueous solution. Thus, the crude oil is heated to about 40 to about 75° C. and NaOH is added with stirring and allowed to react for approximately 10 to 45 minutes. This is followed by stopping the stirring while continuing heat, removing the aqueous layer, and treating the neutralized oil to remove soaps. The oil is treated by water washing the oil until the aqueous layer is of neutral pH, or by treating the neutralized oil with a silica or ion exchange material. The oil is dried at about 95° C. and about 10 mmHg. In some instances, the caustic solution is degassed before it contacts the oil.

Alternatively, rather than removing FFAs from the oil by chemical refining, the FFAs can be removed by physical refining. For example, the oil can be physically refined during deodorization. When physical refining is performed, the FFAs are removed from the oil by vacuum distillation performed at low pressure and relatively higher temperature. Generally, FFAs have lower molecular weights than triglycerides and thus, FFAs generally have lower boiling points and can be separated from triglycerides based on this boiling point difference and through aid of nitrogen or steam stripping used as an azeotrope or carrier gas to sweep volatiles from the deodorizers.

Typically, when physical refining rather than chemical refining is performed, oil processing conditions are modified to achieve similar final product specifications. For example, when an aqueous acidic solution is used in the degumming step, a higher concentration of acid (e.g., up to about 100% greater concentration, preferably about 50% to about 100% greater concentration) may be needed due to the greater concentration of non-hydratable phosphatides that could otherwise be removed in a chemical refining step. In addition, a greater amount of bleaching material (e.g., up to about 100% greater amount, preferably about 50 to about 100% greater amount) is used.

Before bleaching citric acid (50 wt. % solution) can be added at a concentration of about 0.01 wt. % to about 5 wt. % to the degummed oil and/or chemically refined oil. This mixture can then be heated at a temperature of about 35° C. to about 65° C. and a pressure of about 1 mmHg to about 760 mmHg for about 5 to about 60 minutes.

The degummed oil and/or chemically refined oil is subjected to an absorption process (e.g., bleached) to remove peroxides, oxidation products, phosphatides, keratinoids, chlorphyloids, color bodies, metals and remaining soaps formed in the caustic refining step or other processing steps. The bleaching process comprises heating the degummed oil or chemically refined oil under vacuum of about 0.1 mmHg to about 200 mmHg and adding a bleaching material appropriate to remove the above referenced species (e.g., neutral earth (commonly termed natural clay or fuller's earth), acid-activated earth, activated clays and silicates) and a filter aid, whereupon the mixture is heated to about 75-125° C. and the bleaching material is contacted with the degummed oil and/or chemically refined oil for about 5-50 minutes. It can be advantageous to degas the bleaching material before it contacts the refined oil. The amount of bleaching material used is from about 0.25 wt. % to about 3 wt. %, preferably about 0.25 wt. % to about 1.5 wt. %, and more preferably about 0.5 wt. % to about 1 wt. %. After heating, the bleached oil or refined, bleached oil is filtered and deodorized.

The bleached oil or refined, bleached oil is deodorized to remove compounds with strong odors and flavors as well as remaining free fatty acids. The color of the oil can be further reduced by heat bleaching at elevated temperatures. Deodorization can be performed by a variety of techniques including batch and continuous deodorization units such as batch stir tank reactors, falling film evaporators, wiped film evaporators, packed column deodorizers, tray type deodorizers, and loop reactors. Typically, a continuous deodorization process is preferred. Generally, deodorization conditions are performed at about 160 to about 270° C. and about 0.002 to about 1.4 kPa. For a continuous process, particularly in a continuous deodorizer having successive trays for the oil to traverse, a residence time of up to 2 hours at a temperature from about 170° C. to about 265° C.; a residence time of up to about 30 minutes at a temperature from about 240° C. to about 250° C. is preferred. Deodorization conditions can use carrier gases for the removal of volatile compounds (e.g., steam, nitrogen, argon, or any other gas that does not decrease the stability or quality of the oil).

Furthermore, when physical rather than chemical refining is used, a greater amount of FFAs are removed during the deodorization step, and the deodorizer conditions are modified to facilitate the removal of free fatty acids. For example, the temperature is increased by about 25° C.; oils can be deodorized at temperatures ranging from about 165° C. to about 300° C. In particular, oils can be deodorized at temperatures ranging from about 250° C. to about 280° C. or about 175° C. to about 205° C. In addition, the retention time of the oil in the deodorizer is increased by up to about 100%. For example, the retention time can range from less than about 1, 5, 10, 30, 60, 90, 100, 110, 120, 130, 150, 180, 210 or 240 minutes. Additionally, the deodorizer pressure can be reduced to less than about $3\times10^{-4}$, $1\times10^{-3}$, $5\times10^{-3}$, 0.01, 0.02, 0.03, 0.04, 0.05, 0.06, 0.07, 0.08, 0.09, or 0.1 kPa. The deodorization step results in a refined, bleached and deodorized (RBD) oil.

Optionally, RBD oils can be stabilized by partial hydrogenation and/or by the addition of stabilizers or by minimizing the removal or degradation of microcomponents that aid in maintaining oil stability and quality. Partial hydrogenation stabilizes an oil by reducing the number of double bonds in the fatty acids contained in the oil and thus, reducing the chemical reactivity of the oil. However, partial hydrogenation can increase the concentration of undesirable trans-fatty acids.

Stabilizers generally act to intercept free radicals formed during oxidation. Interception of the free radicals by stabilizers, which become either more stable free radicals or rearrange to become stable molecules, slows the oxidation of the oil due to the decreased concentration of highly reactive free radicals that can oxidize more fatty acid units.

For each of the above steps in section II., at each step the exposure to oxygen was optionally minimized, the exposure to heat was optionally minimized, the exposure to UV light was optionally minimized and optionally, stabilizers were added to the seed meats or seed oil before, during, or after processing. These and other process improvements for preparing oils of the present invention are described and exemplified in U.S. patent application Ser. No. 11/267,810 entitled "Processes for Preparation of Oil Compositions" filed Nov. 4, 2005, attorney docket no. MTC 6921.201 (38-21(53354C)), which is incorporated by reference herein in its entirety.

III. Handling and Storage of Oil Compositions

Generally, when storing oil compositions it is advantageous to minimize further oxidation of the fatty acids. One way to do this is to store the oils in the dark or in substantially opaque containers, keep them at a moderate temperature and preferably, in the presence of an inert gas. Preferably, the oil has stability characteristics, which paired with storage conditions and/or stabilizers, will inhibit the reversion of the oil's flavor, odor, color, and the like.

Oil compositions described above in section I. typically have advantageous storage stability characteristics.

For example, in one embodiment, a process for maintaining the storage stability of an oil during shipment or storage comprises storing an oil described in section I. in a container at a temperature ranging from about 4 to about 45° C. for at least one month, wherein the oil has an anisidine value of less than 3 after storage. In another embodiment, a process for maintaining the storage stability of an oil during shipment or storage comprises storing an oil of the invention in a container at a temperature ranging from about 4 to about 45° C. for at least one month, wherein the absolute change in the anisidine value of the oil during storage is no more than about 0.05, 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 11, 12, 13, 14, 15, 16, 17, 18, 19 or 20. Further, the oil can be stored in an oxygen-free or reduced-oxygen atmosphere. Preferably, the oil can be stored at about room temperature; preferably, the oil can be stored at about room temperature for about 2, 3, 4, 5, 6, 7, 8, 9, 10, 11 or 12 months or more. Alternatively, the oil can be stored under refrigeration for at least one month; further, the oil can be stored under refrigeration for about 2, 3, 4, 5, 6, 7, 8, 9, 10, 11 or 12 months or more. In another embodiment, the oil is derived from a source other than a marine oil, such as fish, algae, or krill. In a further embodiment of the process of this section, the oil is derived from a plant oil other than blackcurrant oil, borage oil, Echium oil, evening primrose oil, gooseberry oil, hemp oil, or redcurrant oil.

The process described above in section III. can further comprise addition of a stabilizer to the oil prior to or during storage. The stabilizer can comprise at least one complexing agent or at least one antioxidant. In one exemplary embodiment, the stabilizer comprises citric acid, TBHQ, ascorbyl palmitate, propyl gallate, or derivatives or combinations thereof.

IV. Food Products

Food products can be prepared comprising anyone of the oil compositions described above in section I. In one embodiment, the food product or food analog has a significantly better flavor quality as compared to that of the same food product or food analog fried in a soy oil comprising about 8-10 wt. % α-linolenic acid or a derivative thereof, wherein flavor quality is determined by a standardized sensory evaluation. In another embodiment, the oil has significantly decreased overall room-odor intensity as compared to that of a soy oil comprising about 8-10 wt. % α-linolenic acid or a derivative thereof, a significant difference in overall room-odor intensity being indicated by a difference of greater than 1.0 obtained in a standardized sensory evaluation.

Another aspect of the present invention is a method of making a food composition comprising frying a food product or food analog in an oil composition described above in sections I.A. through I.D. Further, the method produces the food product or food analog has a significantly better flavor quality as compared to that of the same food product or food analog fried in an oil comprising about 8-10 wt. % α-linolenic acid or a derivative thereof and otherwise having the same composition, wherein flavor quality is determined by a standardized sensory evaluation. Advantageously, the oil used in the method of frying has significantly decreased overall room-odor intensity as compared to that of an oil comprising about 8-10 wt. % α-linolenic acid or a derivative thereof and otherwise having the same composition, a significant difference in overall room-odor intensity being indicated by a difference of greater than 1.0 obtained in a standardized sensory evaluation.

In another embodiment, the method of frying uses an oil having a frying life at least 25% longer as compared to that of an oil comprising about 8-10 wt. % α-linolenic acid or a derivative thereof and otherwise having the same composition.

Having described the invention in detail, it will be apparent that modifications and variations are possible without departing the scope of the invention defined in the appended claims. Furthermore, it should be appreciated that all examples in the present disclosure are provided as non-limiting examples.

EXAMPLES

Example 1

Sensory Evaluation of Low ALA Oil

Oils as processed using the process described above in section I. were evaluated in a frying application using tortilla chips as the end product for evaluation. Tortilla chips were selected based upon their popularity in the marketplace, ease of test execution relative to potato chips, and their high oil absorption rate. Oils were compared to three commercially available frying oil options (one corn, two soy). Tortilla chips and oil were collected at frequent intervals throughout a 24 hour frying period. Analytical and sensory tests were conducted on the samples. Summarized below are the findings of the sensory analysis for the oils and the tortilla chips that received no shelf life age.

Sensory Findings

Sensory panelists were able to detect differences between samples.

Frying oil order changed with frying time but remained within acceptable ranges for all oils tested.

Tortilla chip attributes did not change appreciably as a function of frying time.

Tortilla chip attributes were within acceptable ranges for most of the key attributes across all oils.

When differences existed, the low ALA oils were better than the commercial soy oil included in the test.

Detailed Description of Findings

Part 1. Materials

Two low ALA oil samples, differing only in the presence or absence of an antioxidant were tested. Three different commercially available frying oils from ADM were selected for the study. An industry standard corn oil was chosen for inclusion based upon its heavy usage in tortilla chip frying applications. A soybean oil stated to be appropriate for light frying applications with high turnover rates was selected as a direct comparison to the experimental options. The third commercial oil was a partially hydrogenated soy oil with high resistance to breakdown, intended for extended frying life. The coding system used throughout all of this report is PHS=partially hydrogenated soy, LLSY=low ALA soy with antioxidant and LLSN=low ALA soy without antioxidant.

Tortilla chips for the study were hand cut from six-inch white corn tortillas supplied by Azteca Foods, Inc. Thickness of the tortillas was 1.17-1.24 mm. Products were cut into triangles using a template. Size was designed so that the cumulative weight of five chips would achieve the desired fryer load. The tortillas were less than one week of age when cut into chips. Chips were held at 0° F. until the time of the study. Frozen chips were removed from storage and thawed at room temperature 12-18 hours prior to use.

Presto brand Fry Daddy fryers (model 05420) were used for the study. Each fryer was equipped with an external temperature controller from J-Kem. A separate fryer was dedicated to each oil variable for the duration of the study.

A tortilla chip industry standard film for packaging samples was obtained from Printpack, Inc. HDPE bottles were used for oil samples sent for analytical testing. Glass vials were used for oil samples collected for sensory order testing.

Part 2. Protocol

Fryers were loaded with 965 g of oil at the outset of the study, which was the amount required to reach the internally marked fill line. Fryers were allowed to preheat for 30 minutes prior to the start of frying each day. Fryer load ratio (chip weight to oil weight) was based upon commercial frying operational data. Frying conditions were 180° C. for one minute. Temperature readings from the controllers were recorded every 15 minutes on day one of frying and then hourly on subsequent days.

At the end of each frying cycle of one minute, chip samples were removed. Ten seconds after chip removal, another load was added to the fryer in an attempt to simulate continuous frying conditions as closely as possible while using a batch process. Chips were removed and discarded except for the selected collection time periods. Oil was added to the fryers every hour to restore the level to the original fill line.

Both chips and oil were collected at time zero and then every three hours over a twenty-four hour frying period. Tortilla chip samples were collected the last five minutes of each three hour frying period. Samples were removed from the oil, then placed in a single layer on a bakery cooling rack so that excess oil could drain from the product. Samples were placed into film packages and then put in frozen storage until the time of sensory evaluation. After frying for three hours, oil was allowed to cool and was then filtered through a paper coffee filter to remove fragments of chips. After filtration, samples of oil were collected for analytical and sensory testing. Filtered oil was returned to the fryer. Oil level was restored to the fill line with fresh oil. Once the process was complete and the fryers returned to temperature, the study resumed. Chips were fried for a total of six hours per day over the course of four days. Total amount of oil consumed for the study was tracked on a cumulative basis and not at each hourly addition. Amount lost during filtration was not individually tracked but assumed to be constant across all variables and was included as part of the total.

It should be noted that one oil sample was compromised during the collection period. Fresh oil was added to the LLSY fryer prior to the collection of the 24 hour sample. The impact would be limited to analytical and sensory analysis of the oil.

Oil samples were submitted for analytical testing. Small vials of oil were retained for sensory order testing. Sensory testing was also used for the evaluation of the tortilla chips.

Products were evaluated by five or six panelists. Selection of attributes to include in the evaluation, appropriate terminology and the approach were developed by the sensory panel. Sixty point linear scales were selected for use on all attributes. A separate training session was conducted on the oils and the chips prior to the execution of the tests. Labeled reference products were provided as part of the training session and were included in the testing itself.

Sensory data from the testing was analyzed using ANOVA followed by paired comparison testing using Duncan's methodology. Data were not blocked by panelist for the analysis. Samples within a given collection time period were compared to one another to determine whether there were any statistically significant differences between the products.

Sensory attribute means were compiled for each variable at every collection time period. Those means were then plotted as a function of frying time for each sensory attribute to determine whether sensory attributes were changing. No statistical analysis was conducted on the means as a function of frying time.

Part 3. Discussion of Findings
Sensory Analysis of Oils

The total oil odor intensity and the off odor intensity were measured on the oil samples. The overall oil odor intensity was within the acceptance range for all oils at all collection periods. Within any given sampling time (frying oil age), differences between oil types were small and not statistically significant. Intensity of oil odor increased between time zero and six hours with the greatest change occurring between zero and three hours. Intensity reached a plateau between six and nine hours for all oils except partially hydrogenated soy which was between nine and twelve hours of frying.

Off odor intensity levels were within the acceptance range for all oils at all times with one exception. Partially hydrogenated soy slightly exceeded the acceptance limit at 12 hours of frying. As with the oil intensity, the differences between oils within a time period was small and not statistically significant. There was one exception and that was that partially hydrogenated soy oil had a higher off odor intensity than low ALA soy without antioxidant at the 12 hour sampling period. Off odor intensity increased and reached a plateau in the very same manner as the overall oil odor intensity.

Sensory Analysis on Tortilla Chips

Ten different attributes were measured on the tortilla chips. Time zero was measured as a point of reference only for the changes that occurred as a function of frying time. In commercial practice, time zero would never exist; therefore, the discussion of sensory findings will exclude time zero unless otherwise noted. Sensory crispness was dropped from the analysis because the panelists did not find differences between samples within or between sampling periods. This left a total of nine attributes measured over the period of 3-24 hours of frying time.

Six of the nine attributes were within their respective acceptance ranges for all oils at all time periods. Those attributes were color, color uniformity, oil flavor intensity, oil coat in the mouth, off flavor intensity and overall acceptability. For three of the attributes, selected oils were out of the acceptance ranges for one or more of the time periods. The attribute with the most oils and frequency of products out of the acceptable range was oil intensity. Corn flavor intensity was too low in selected instances.

Oil Types Out of Acceptance Ranges

| Frying Time (hrs) | Tactile Oiliness | Oil Odor Intensity | Corn Flavor Intensity |
|---|---|---|---|
| 3 | | Soy PHS | Soy |
| 6 | | Soy PHS Corn | Soy |
| 9 | | Soy | |
| 12 | | Soy PHS | Soy PHS |
| 15 | | Soy PHS LLSY LLSN | Soy |
| 18 | Soy Corn LLSY | Soy PHS Corn LLSY | Soy PHS |
| 21 | | Soy PHS | |
| 24 | | | |

Whether the attributes were within or outside of their respective acceptance ranges, statistically significant differences existed. When the differences existed, the low ALA oils usually performed better than soy and partially hydrogenated soy oils. Performance of the low ALA oils was closest to the corn oil.

When using 60 point linear scales, breakpoints in the data were used to establish how meaningful the differences may be. A difference of 6-10 points is considered to be clear, but not large. It is a magnitude that may be detected by a panel trained for the product's evaluation and by individuals familiar with the product line. A difference greater than 10 points is generally large enough for a consumer to notice. The table below summarizes the differences between oils that were 10 points or greater and were statistically significant at the 90 or 95% confidence level. This summary is to demonstrate how the low ALA oils performed relative to the commercial oils, bearing in mind that the comparisons may be drawn on samples that were all within their respective acceptable limits.

Statistically Significant Differences >10 Points

| Attribute | Frying Time (hrs) | Direction and Magnitude |
|---|---|---|
| Oil Odor Intensity | 18 | LLSN < Soy (10 pts) |
| Oil Flavor Intensity | 3 | LLSY < Soy (11 pts) |
| | 12 | LLSY < Soy (10 pts) |
| | 18 | LLSN < Soy (12 pts) |
| | 18 | Corn < Soy (10 pts) |
| Off Flavor Intensity | 6 | LLSY, LLSN, CORN < Soy (11-12 pts) |
| | 9 | Corn < Soy (10 pts) |
| | 12 | LLSY, LLSN, Corn < Soy (12-13 pts) |
| | 15 | Corn < Soy (10 pts) |
| | 18 | Corn, LLSN < Soy (11-12 pts) |
| Overall Acceptability | 3 | LLSN > Soy (10 pts) |
| | 6 | LLSY > Soy (10 pts) |
| | 18 | Corn > Soy (12 pts) |

Sensory means for each of the tortilla chip attributes were plotted as a function of frying time. The pattern of change in intensity followed by a plateau noted when testing the frying oils was not repeated in the tortilla chips. Most of the values for the attributes remained unchanged as a function of frying time. The panelists could detect a change in the oils but those changes were not evident in the tortilla chips fried in the oils.

Figure 2:
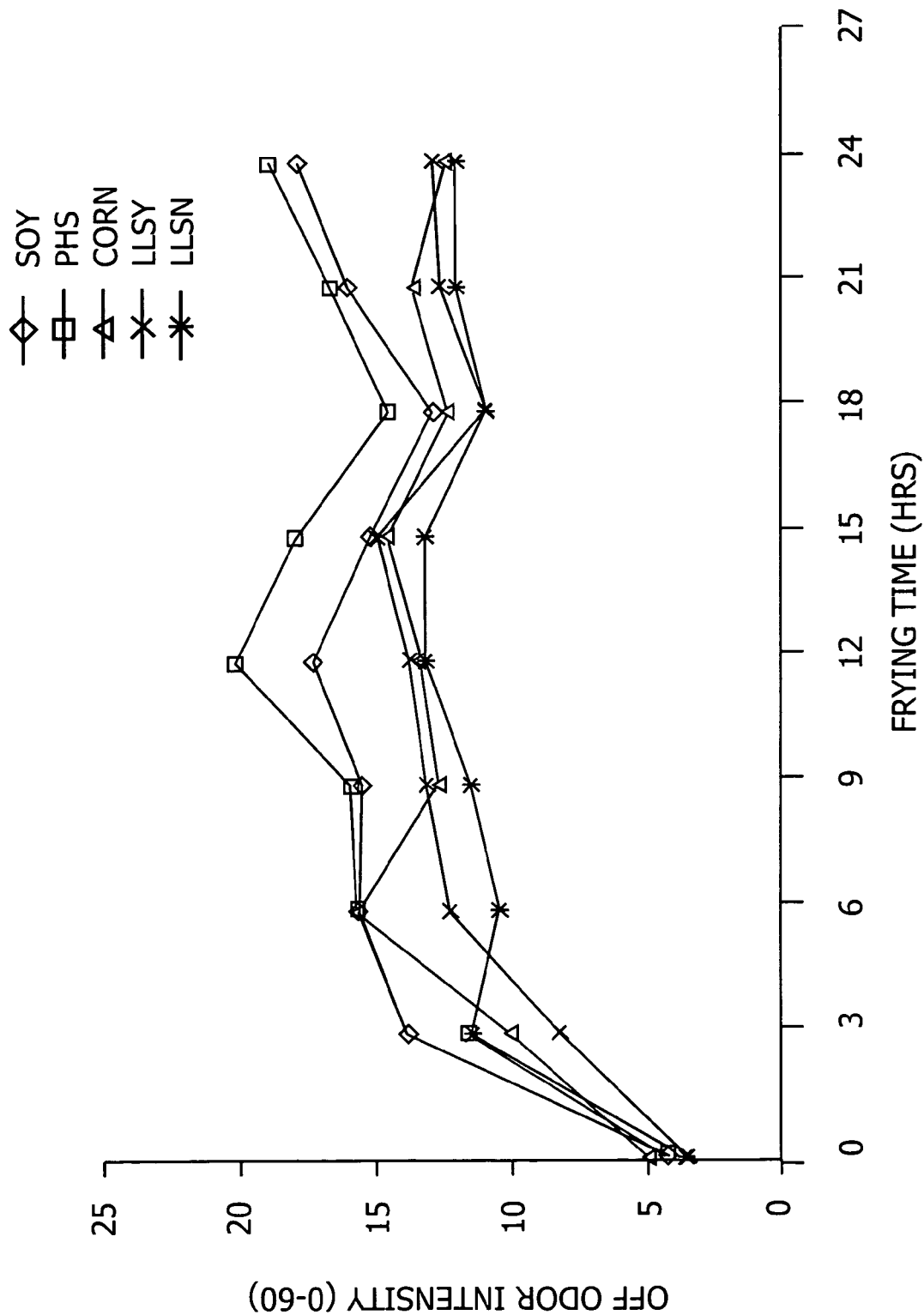
FIG. 2 is a graph of the oil off odor versus the amount of time the oil had been used for frying; the method is described in Example 1.
Figure 3:
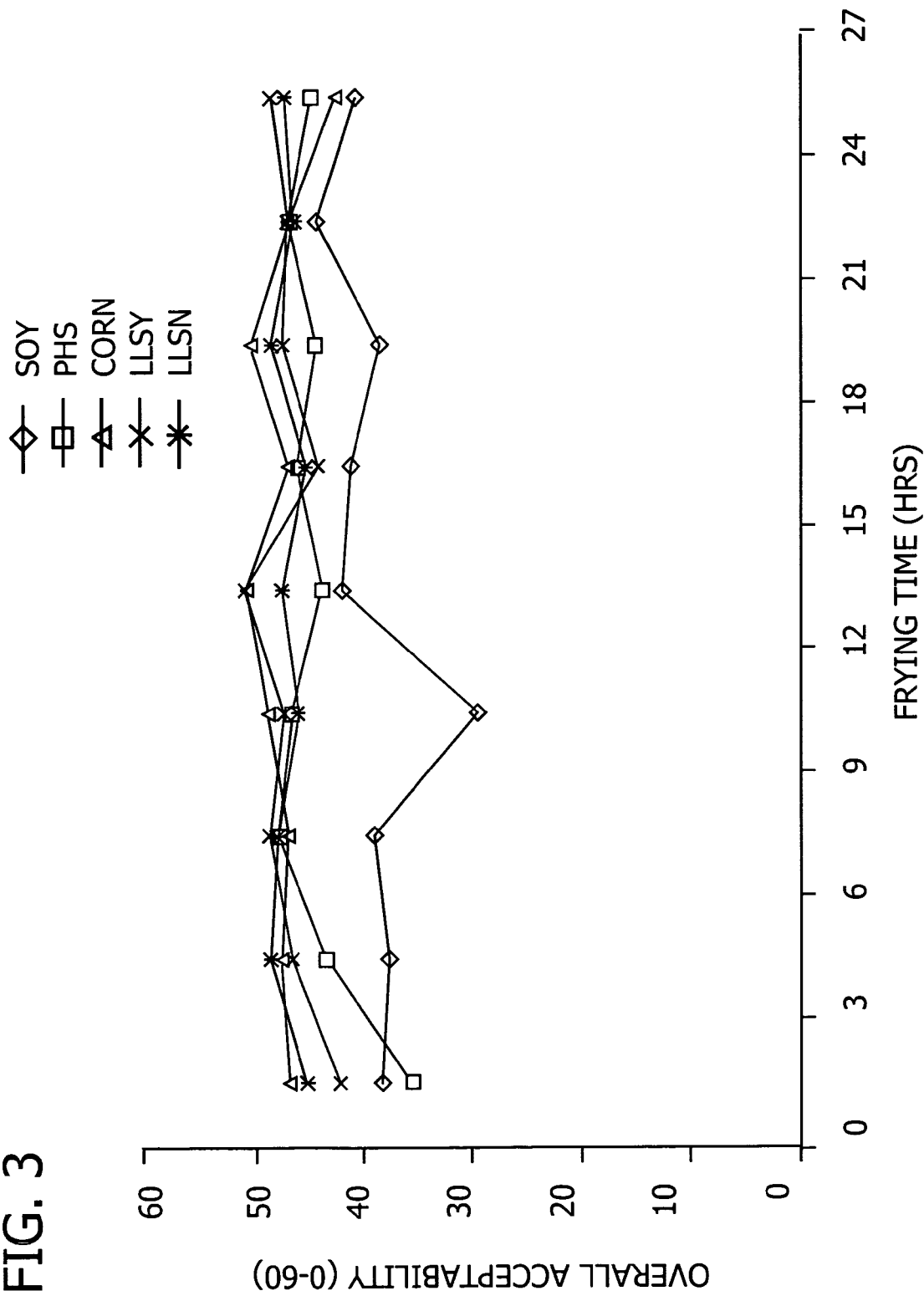
FIG. 3 is a graph of the overall chip acceptability versus the amount of time the oil had been used for frying; the method is described in Example 1.

Graphs of certain sensory attributes of the oils versus the frying time age of the oils are depicted in FIG. 1-3.

What is claimed is:

1. A soy oil composition comprising either:
   (a) not more than about 8 wt. % α-linolenic acid or a derivative, from about 55 to about 85 wt. % oleic acid or a derivative thereof, and from about 2 to about 35 wt. % linoleic acid or a derivative thereof, and not more than about 10 wt. % saturated fatty acid or a derivative thereof based upon the total weight of fatty acids or derivatives thereof in the composition;
   (b) not more than about 4 wt. % α-linolenic acid or a derivative, from about 20 to about 30 wt. % stearic acid or a derivative thereof, not more than about 40 wt. % linoleic acid or a derivative thereof, not more than about 30 wt. % oleic acid or a derivative thereof, and not more than about 10 wt. % palmitic acid or a derivative thereof, based upon the total weight of fatty acids or derivatives thereof in the composition.

2. The composition of claim 1 comprising not more than about 10 wt. % palmitic acid or a derivative thereof.

3. The composition of claim 1 comprising not more than about 8 wt. % α-linolenic acid or a derivative thereof.

4. The composition of claim 1 comprising not more than about 8 wt. % α-linolenic acid or a derivative, from about 55 to about 85 wt. % oleic acid or a derivative thereof, and from about 2 to about 35 wt. % linoleic acid or a derivative thereof, and not more than about 10 wt. % saturated fatty acid or a derivative thereof, based upon the total weight of fatty acids or derivatives thereof in the composition.

5. The composition of claim 1 comprising not more than about 4 wt. % α-linolenic acid or a derivative, from about 20 to about 30 wt. % stearic acid or a derivative thereof, not more than about 40 wt. % linoleic acid or a derivative thereof, not more than about 30 wt. % oleic acid or a derivative thereof, and not more than about 10 wt. % palmitic acid or a derivative thereof, based upon the total weight of fatty acids or derivatives thereof in the composition.

* * * * *

INTER PARTES REEXAMINATION CERTIFICATE (1155th)

United States Patent
Makadia et al.

(10) Number: US 8,057,835 C1
(45) Certificate Issued: Aug. 17, 2015

(54) SEED OIL COMPOSITIONS

(75) Inventors: Vallabh Makadia, St. Louis, MO (US); Juan P. Arhancet, Creve Coeur, MO (US); Jerald D. Heise, St. Louis, MO (US)

(73) Assignee: MONSANTO TECHNOLOGY LLC, St. Louis, MO (US)

Reexamination Request:
No. 95/002,309, Sep. 14, 2012

Reexamination Certificate for:
Patent No.: 8,057,835
Issued: Nov. 15, 2011
Appl. No.: 11/267,540
Filed: Nov. 4, 2005

Related U.S. Application Data

(60) Provisional application No. 60/633,914, filed on Dec. 6, 2004, provisional application No. 60/625,506, filed on Nov. 4, 2004.

(51) Int. Cl.
| | |
|---|---|
| *C11B 3/00* | (2006.01) |
| *A23D 9/04* | (2006.01) |
| *C11B 5/00* | (2006.01) |
| *C11B 1/02* | (2006.01) |
| *C11B 3/12* | (2006.01) |
| *C11B 1/10* | (2006.01) |
| *C11B 3/04* | (2006.01) |
| *C11B 3/06* | (2006.01) |
| *C11B 3/14* | (2006.01) |
| *C11B 1/06* | (2006.01) |
| *C11B 3/10* | (2006.01) |
| *A21D 13/00* | (2006.01) |
| *A23D 9/00* | (2006.01) |

(52) U.S. Cl.
CPC ............ *C11B 3/001* (2013.01); *A21D 13/0074* (2013.01); *A23D 9/00* (2013.01); *A23D 9/04* (2013.01); *C11B 1/02* (2013.01); *C11B 1/06* (2013.01); *C11B 1/10* (2013.01); *C11B 1/104* (2013.01); *C11B 3/04* (2013.01); *C11B 3/06* (2013.01); *C11B 3/10* (2013.01); *C11B 3/12* (2013.01); *C11B 3/14* (2013.01); *C11B 5/0007* (2013.01)

(58) Field of Classification Search
None
See application file for complete search history.

(56) References Cited

To view the complete listing of prior art documents cited during the proceeding for Reexamination Control Number 95/002,309, please refer to the USPTO's public Patent Application Information Retrieval (PAIR) system under the Display References tab.

*Primary Examiner* — Alan Diamond

(57) ABSTRACT

The present invention is directed to seed oil compositions that can be used for cooking and frying applications. These oil compositions of the present invention have advantageous stability characteristics. In some embodiments, the oil compositions have a low concentration of α-linolenic acid.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-5 are cancelled.

\* \* \* \* \*